United States Patent
Cohen et al.

(10) Patent No.: US 8,179,312 B2
(45) Date of Patent: May 15, 2012

(54) PRECISE ABSOLUTE TIME TRANSFER FROM A SATELLITE SYSTEM

(75) Inventors: Clark E. Cohen, Washington, DC (US); David A. Whelan, Newport Coast, CA (US); Robert W. Brumley, Narberth, PA (US); Gregory M. Gutt, Ashburn, VA (US); Barton G. Ferrell, Troy, IL (US)

(73) Assignee: The Boeing Company, Chicago, IL (US)

( * ) Notice: Subject to any disclaimer, the term of this patent is extended or adjusted under 35 U.S.C. 154(b) by 6 days.

(21) Appl. No.: 12/833,795

(22) Filed: Jul. 9, 2010

(65) Prior Publication Data

US 2011/0148701 A1 Jun. 23, 2011

Related U.S. Application Data

(62) Division of application No. 12/130,893, filed on May 30, 2008, now Pat. No. 8,035,558.

(51) Int. Cl.
*G01S 19/37* (2010.01)
*G01S 19/38* (2010.01)

(52) U.S. Cl. .............. 342/357.77; 342/357.21

(58) Field of Classification Search ............ 342/357.21, 342/357.46, 357.64, 357.77; 701/213
See application file for complete search history.

(56) References Cited

U.S. PATENT DOCUMENTS

| | | | |
|---|---|---|---|
| 5,365,450 A | 11/1994 | Schuchman et al. | |
| 5,510,801 A | 4/1996 | Engelbrecht et al. | |
| 5,646,630 A | 7/1997 | Sheynblat et al. | |
| 5,812,086 A | 9/1998 | Bertiger et al. | |
| 5,812,961 A | 9/1998 | Enge et al. | |
| 5,831,574 A | 11/1998 | Krasner | |
| 5,841,396 A | 11/1998 | Krasner | |
| 5,841,398 A | 11/1998 | Brock | |
| 5,944,770 A | 8/1999 | Enge et al. | |
| 6,157,621 A | 12/2000 | Brown et al. | |
| 6,178,195 B1 | 1/2001 | Durboraw, III et al. | |
| 6,266,533 B1 | 7/2001 | Zadeh et al. | |
| 6,271,788 B1 | 8/2001 | Longaker et al. | |
| 6,373,432 B1 | 4/2002 | Rabinowitz et al. | |
| 6,389,291 B1 | 5/2002 | Pande et al. | |
| 6,400,314 B1 | 6/2002 | Krasner | |
| 6,433,734 B1 | 8/2002 | Krasner | |
| 6,526,352 B1 | 2/2003 | Johnson et al. | |

(Continued)

FOREIGN PATENT DOCUMENTS

WO   WO 2005/081011   9/2005

(Continued)

OTHER PUBLICATIONS

U.S. Appl. No. 60/801,764, Cohen et al.
Fossa et al., Department of Electrical and Computer Engineering, An Overview of the Iridium Low Earth Orbit (LEO) Satellite System, 1998 IEEE, pp. 152-159.
NAL—Network Reference—Iridium Subscriber Unit, http://www.nalresearch.com/NetRef_IridiumSubscriberUnit.html, 2006, 2 pages.

(Continued)

*Primary Examiner* — Dao Phan
(74) *Attorney, Agent, or Firm* — Haynes and Boone, LLP

(57) ABSTRACT

Systems and methods according to one or more embodiments are provided for obtaining a precise absolute time using a satellite system. The precise absolute time may be used, for example, as an aid for positioning systems including navigation in attenuated or jammed environments. A method of obtaining precise absolute time transfer from a satellite according to an embodiment comprises: receiving a precision time signal from a satellite, wherein the precision time signal comprises a periodic repeating code; determining a timing phase of the code; receiving additional aiding information; and using the timing phase and the additional aiding information to determine a precise absolute time.

20 Claims, 8 Drawing Sheets

U.S. PATENT DOCUMENTS

| | | | |
|---|---|---|---|
| 6,542,823 B2 | 4/2003 | Garin et al. |
| 6,633,255 B2 | 10/2003 | Krasner |
| 6,674,398 B2 | 1/2004 | Murphy |
| 6,717,547 B2 | 4/2004 | Spilker et al. |
| 6,785,553 B2 | 8/2004 | Chang et al. |
| 6,859,173 B2 | 2/2005 | Spilker et al. |
| 6,922,546 B1 | 7/2005 | Da et al. |
| 6,937,187 B2 | 8/2005 | van Diggelen et al. |
| RE38,808 E | 10/2005 | Schuchman et al. |
| 7,030,814 B2 | 4/2006 | Stone et al. |
| 7,042,392 B2 | 5/2006 | Whalen et al. |
| 7,372,400 B2 | 5/2008 | Cohen et al. |
| 7,400,857 B2 | 7/2008 | Chang et al. |
| 2002/0003490 A1 | 1/2002 | Chang et al. |
| 2002/0082024 A1 | 6/2002 | Bajijar |
| 2004/0042576 A1 | 3/2004 | Anderson |
| 2004/0078594 A1 | 4/2004 | Scott |
| 2005/0156782 A1 | 7/2005 | Whelan et al. |
| 2005/0159891 A1 | 7/2005 | Cohen et al. |
| 2006/0250303 A1 | 11/2006 | Thiel et al. |
| 2007/0058161 A1 | 3/2007 | Nichols et al. |
| 2007/0236387 A1 | 10/2007 | Monnerat |
| 2008/0001818 A1 | 1/2008 | Cohen et al. |
| 2008/0001819 A1 | 1/2008 | Cohen et al. |
| 2008/0059059 A1 | 3/2008 | Cohen et al. |
| 2008/0169958 A1 | 7/2008 | Cohen et al. |
| 2008/0224924 A1 | 9/2008 | Lethbridge |
| 2009/0315764 A1 | 12/2009 | Cohen et al. |
| 2009/0315769 A1 | 12/2009 | Whelan et al. |
| 2010/0171652 A1 | 7/2010 | Gutt et al. |

FOREIGN PATENT DOCUMENTS

| | | |
|---|---|---|
| WO | WO 2007/056738 | 5/2007 |
| WO | WO 2008/105778 | 4/2008 |

OTHER PUBLICATIONS

Globalstar—Wilipedia, the free encyclopedia, http://en.wikipedia.org/wiki/Globalstar, Jul. 17, 2006, 3 pages.

Iridium (satellite)—Wikipedia, the free encyclopedia, http://en.wikipedia.org/wiki/Iridium_%28satellite%29, Jul. 19, 2006, 4 pages.

Kyriazakos et al., Localization of Mobile Terminals, based on a Hybrid Satellite-assisted and Network-based Techniques, 2000, 5 pages.

Stamoulakatos et al., A Review on Cellular Location Methods Targeting Location Based Services, Proceedings of the IASTED International Conference, Sep. 8-10, 2004, 7 pages.

Laitinen et al., Cellular network optimisation based on mobile location, 2001, 51 pages.

ECC Report 95, Electronic Communications Committee (ECC) within the European Conference of Postal and Telecommunications Administrations (CEPT), Sharing Between MSS Systems Using TDMA and MSS Systems Using CDMA in the Band 1610-1626.5 Mhz, Feb. 2007, 38 pages.

ICAO Technical Manual for Iridium, Aeronautical Mobile Satellite (Route) Service, Draft v1.1, May 19, 2006, 48 pages.

Implementation Manual for IRIDIUM Satellite Communications Service, Draft v.1.0, Feb. 15, 2006, 59 pages.

Chowdhury M.R. Shahriar, Mitigation of Interference from Iridium Satellites by Parametric Estimation and Substraction, Dec. 1, 2006, 111 pages.

Agrawal et al., "GPS: Location-tracking technology", Computer, IEEE Service Center, Mar. 1, 2002, pp. 92-94.

GPS World, Centimeter-Accuracy Inddor navigation Using GPS-Like Pseudolites, http://www.gpsworld.com/gpsworld/Design+Challenge/Centimeter-Accuracy-Indoor-Navigation-Using-GPS-Li/ArticleLong/Article/detail/3086, Nov. 1, 2001, 7 pages.

PRECISE ABSOLUTE TIME TRANSFER FROM A SATELLITE SYSTEM

CROSS-REFERENCE TO RELATED APPLICATIONS

This application is a divisional application of U.S. patent application Ser. No. 12/130,893 filed May 30, 2008 entitled "Precise Absolute Time Transfer from a Satellite System" which is hereby incorporated by reference in its entirety.

TECHNICAL FIELD

The present invention relates generally to time transfer and, more particularly, to satellite-based time transfer and navigation techniques.

BACKGROUND

Existing navigation and timing signals provided by various existing satellite navigation systems often do not provide satisfactory system performance. In particular, the signal power, bandwidth, and geometrical leverage of such navigation and timing signals are generally insufficient to meet the needs of many demanding usage scenarios.

Existing navigation and timing approaches based, for example, on Global Positioning System (GPS) signals may not be available to a navigation user in many instances. Typically, a GPS receiver must receive at least four simultaneous ranging sources to permit three dimensional positioning and accurate time transfer. However, GPS signals often provide insufficient, low-signal power or geometry to readily penetrate urban canyons or the walls of buildings. Other navigation approaches based, for example, on cellular telephone or television signals typically lack vertical navigation information.

Existing systems have attempted to address indoor navigation deficiencies by the use of various approaches, for example, inertial navigation systems, specialized beacons, and highly sensitive GPS systems. However, inertial navigation systems drift and are expensive. Beacons require specialized fixed assets that are expensive and not standardized thus having only specialized utility, and sensitive GPS systems often do not perform to user expectations due to the weakness of the GPS signals in indoor environments.

SUMMARY

In one embodiment, a method of obtaining precise absolute time transfer from a satellite comprises: receiving a precision time signal from a satellite, wherein the precision time signal comprises a periodic repeating code; determining a timing phase of the code; receiving additional aiding information; and using the timing phase and the additional aiding information to determine a precise absolute time.

In another embodiment, a method of performing navigation in attenuated or jammed environments comprises: detecting a frame structure of a signal received from a first satellite; aligning a clock of a receiver unit to the detected frame structure; generating multiple time estimates respectively separated according to the frame structure, wherein at least one time estimate will be aligned to a signal of a second satellite; providing the time estimates to system correlators of the receiver unit; aligning the system correlators according to the time estimates; and identifying the at least one time estimate that is aligned to the signal source from the second satellite, wherein the at least one time estimate provides successful aiding information to the receiver unit and significantly improves detection efficiency.

In another embodiment, a receiver unit adapted for use in attenuated or jammed environments comprises: an antenna adapted to receive a precision time signal from a satellite and receive additional aiding information, wherein the precision time signal comprises a periodic repeating code; a processor; and a memory adapted to store a plurality of computer readable instructions which when executed by the processor are adapted to cause the receiver unit to: determine a timing phase of the code, and use the timing phase and the additional aiding information to determine a precise absolute time.

In another embodiment, a receiver unit adapted for use in attenuated or jammed environments comprises: an antenna adapted to receive a precision time signal from a first satellite wherein the precision time signal comprises a frequency band frame structure, and to receive a second signal from a second satellite; a processor; and a memory adapted to store a plurality of computer readable instructions which when executed by the processor are adapted to cause the receiver unit to: detect the frame structure of the first satellite; align an internal clock of the receiver unit to the frame structure of the first satellite; generate multiple time estimates respectively separated according the frame structure of the first satellite, wherein at least one time estimate is aligned to the signal from the second satellite; align system correlators of the receiver unit according to the time estimates; and identify the at least one time estimate that is aligned to the signal from the second satellite such that successful aiding information is provided to the receiver unit.

The scope of the invention is defined by the claims, which are incorporated into this section by reference. A more complete understanding of embodiments of the present invention will be afforded to those skilled in the art, as well as a realization of additional advantages thereof, by a consideration of the following detailed description of one or more embodiments. Reference will be made to the appended sheets of drawings that will first be described briefly.

BRIEF DESCRIPTION OF THE DRAWINGS

Embodiments of the present invention and their advantages are best understood by referring to the detailed description that follows. It should be appreciated that like reference numerals are used to identify like elements illustrated in one or more of the figures.

DETAILED DESCRIPTION

In accordance with various embodiments discussed herein, a system employing satellites, for example, low earth orbit (LEO) satellites, may be used to augment receiver units, for example, cell phones or other compact devices, so that they may function even in heavily attenuated, occluded or jammed environments. Navigation systems according to one or more embodiments herein may address current problems of receiver units that are due to fundamentally weak signals received from existing sources such as Global Positioning System (GPS) satellites.

Signals from certain satellites, for example, communication satellites, are generally more powerful than signals from other existing positioning systems such as GPS. One such satellite is the Low Earth Orbiting Satellite (LEO) constellation Iridium. In an example, a receiver unit configured to work with signals received from a LEO satellite, for example an Iridium satellite, may work with signal levels of less than about 45 dB of attenuation at the receiver unit's antenna, whereas GPS-configured receiver units typically will not work at such levels. By leveraging Iridium satellite signals, the Iridium-configured receiver unit may operate at about 15-20 db below where a typical GPS-configured receiver unit would stop working.

According to various embodiments, such powerful signals, which include precision time signals from the satellite system, may be used to determine a precise absolute time to an accuracy of, for example, approximately 1-10 microseconds. Also, such powerful signals may be transferred to a receiver unit along with information from other ground based infrastructure, such as a cellular network, an internet network, or WiFi. According to one or more embodiments, the precise absolute time derived from the satellite signals is sufficiently accurate to facilitate aligning system correlators in a receiver unit to focus in very narrow periods of time. When multiple system correlators are used without the benefit of a precise time reference in occluded or jammed environments, the correlation process is computationally burdened by searching over large time periods and the receiver unit may not be able to perform under such conditions. However, with the transfer of precise absolute time (e.g., having an accuracy within approximately 10 microseconds) a receiver unit (or user) may better receive and track navigation signals from a positioning system such as GPS by aligning the receiver unit's system correlators even in highly attenuated or jammed environments. Thus, embodiments of the present invention may aid GPS or any other positioning satellite system in heavily attenuated or jammed environments. It should be appreciated that precise absolute time transfer may also be used in other applications such as network synchronization.

Figure 1:
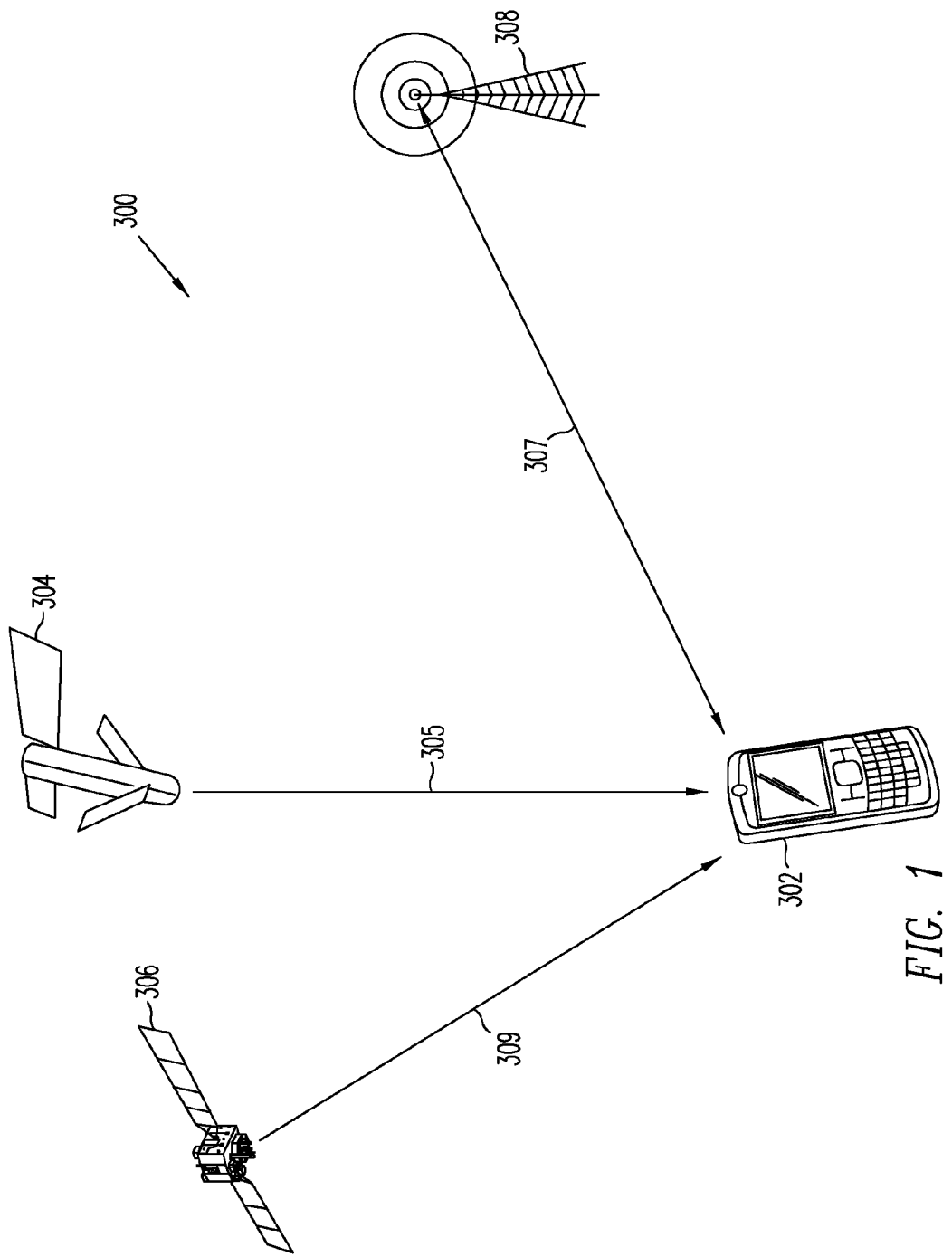
FIG. 1 provides an overview of a navigation system that is able to perform in occluded or jammed environments according to an embodiment of the present invention.

Referring now to the figures wherein the showings are for purposes of illustrating embodiments of the present invention only, and not for purposes of limiting the same, FIG. 1 provides an overview of a navigation system 300 that is able to perform in occluded or jammed environments according to an embodiment of the present invention.

As shown in the embodiment of FIG. 1, in navigation system 300, a receiver unit 302 (e.g., a cellular telephone), is configured to receive signal 309 from a satellite 306, which may include a global positioning system (GPS) signal (e.g., protected and/or unprotected GPS signal) from conventional navigation satellites. In addition, receiver unit 302 is configured to receive signal 305 from a satellite 304, which may be a low earth orbit (LEO) satellite. Furthermore, receiver unit 302 is configured to receive signal 307 from a network 308, which may include, for example, a cellular network, an Internet network, a WiFi network, and/or other networks. Signal 305 received from satellite 304 comprises a precision time signal coded on satellite 304. Signal 307 received through network 308 may include additional aiding information such as, for example, orbit information associated with satellite 304, an approximate location of receiver unit 302, an approximate range between satellite 304 and receiver unit 302 (e.g., within approximately 3000 m), approximate time information (e.g., approximate time within about 5 seconds), timing bias information associated with satellite 304 (e.g., satellite clock offsets), and/or other information.

According to one or more embodiments, satellite 306 may be a part of an integrated high-performance navigation and communication system such as an iGPS system. Satellite 306 may also be a part of any other positioning system satellite, including for example, the Global Orbiting Navigation System (Glonass).

In one example, satellite 304 may be a LEO satellite, which may be implemented by a satellite of an existing communication system (e.g., Iridium or Globalstar satellite systems). In one example where an Iridium satellite is used to implement satellite 304, flight computers of the Iridium satellite may be reprogrammed with appropriate software to facilitate the handling of navigation signals. In another example where a Globalstar communication satellite is used to implement satellite 304, the satellite bent pipe architecture permits ground equipment to be upgraded to support a variety of new signal formats.

In embodiments where satellite 304 is implemented as a LEO communication satellite, the LEO communication satellite may be configured to support communication signals as well as navigation signals. In this regard, such navigation signals may be implemented to account for various factors such as multipath rejection, ranging accuracy, cross-correlation, resistance to jamming and interference, and security, including selective access, anti-spoofing, and low probability of interception.

Receiver unit 302 may be implemented with appropriate hardware and/or software to receive and decode signals from a variety of space and terrestrial ranging sources to perform navigation. Such signals may include, for example, satellite broadcasts from GPS (or any other positioning system (e.g., Glonass), LEO (e.g., Iridium or Globalstar satellite systems), Wide Area Augmentation System (WAAS), European Geostationary Navigation Overlay Service (EGNOS), Multi-functional Satellite Augmentation System (MSAS), Galileo, Quasi-Zenith Satellite System (QZSS), and/or Mobile Satellite Ventures (MSV) satellites. Such signals may also include terrestrial broadcasts from network 308, which may include cellular networks, TV networks, Internet networks, WiFi, WiMAX, National Vehicle Infrastructure Integration (VII) nodes, and other appropriate sources. Receiver unit 302 may be implemented in accordance with various embodiments set forth in U.S. patent application Ser. No. 11/268,317 filed on Nov. 7, 2005 which is incorporated herein by reference.

Receiver unit 302 may be further configured to receive and perform navigation using broadcasted signals of other space and terrestrial ranging sources as may be desired in particular embodiments. In addition, receiver unit 302 may be configured with an inertial measurement unit (IMU) implemented, for example, as a microelectromechanical system (MEMS) device to provide jamming protection.

Receiver unit 302 may also be implemented in any desired configuration as may be appropriate for particular applications. For example, in various embodiments, receiver unit 302 may be implemented as a cellular telephone, an iGPS receiver, a handheld navigation device, a vehicle-based navigation device, an aircraft-based navigation device, or other type of device. In an embodiment, the position of receiver unit 302 may correspond to the position of a user.

Figure 1A:
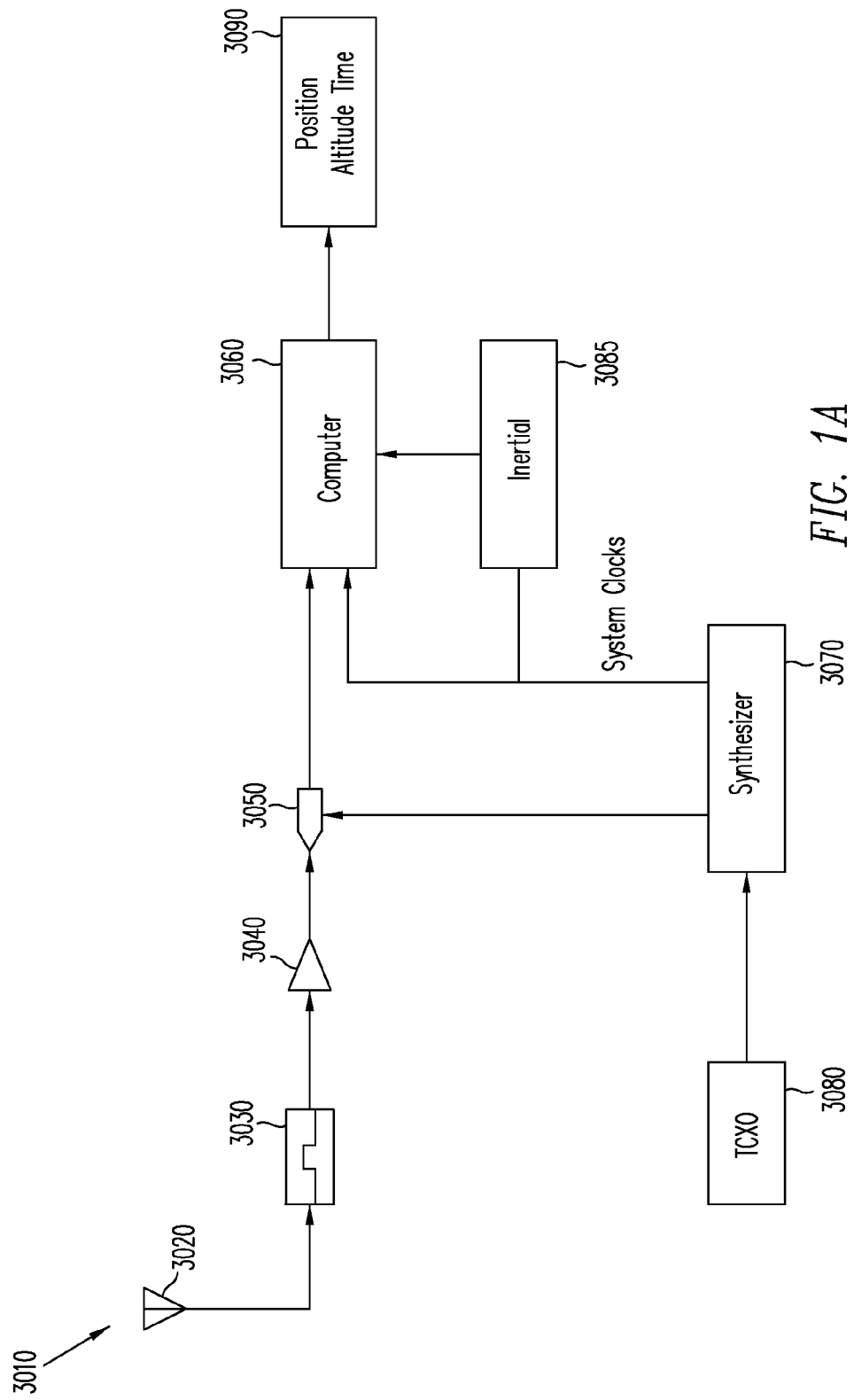
FIG. 1A shows a functional block diagram of receiver unit 302 according to an embodiment of the disclosure.

Referring to FIG. 1A, a functional block diagram of receiver unit 302 is shown according to an embodiment of the disclosure. Receiver unit 302 includes a multi-frequency antenna 3020 adapted to receive satellite signals 3010 from one or more satellites. Antenna 3020 may also be adapted to receive signals from network 308 of FIG. 1, for example. Antenna 3020 is coupled to one or more pre-select filters 3030, an amplifier 3040 and an A/D converter 3050. Synthesizer 3070 receives a signal from temperature controlled crystal oscillator (TCXO) 3080, and is coupled to A/D converter 3050, inertial 3085 and computer 3060, which comprises a memory and a processor (not shown). System correlators may be implemented by the processor. Computer 3060 receives raw measurements from inertial 3085 as well as input from synthesizer 3070 and A/D converter 3050 to produce an output of position, altitude, and time 3090. The sampling rate of A/D converter 3050 may be appropriately determined such that receiver unit 302 may downconvert to baseband all bands of interest.

In operation, according to one or more embodiments, in locations where receiver unit 302 is occluded or jammed and cannot receive signal 309 (e.g., GPS signal) from satellite 306, receiver unit 302 may send a message to network 308 requesting assistance. Network 308 then determines additional aiding information. Receiver unit 302 then uses signal 307, which comprises the additional aiding information obtained through network 308 in combination with signal 305 received from satellite 304, which comprises a precision time signal, to align its system correlators to improve reception of signal 309 (e.g. GPS signal) from satellite 306 and therefore be able to perform navigation even in occluded or jammed environments.

Figure 2:
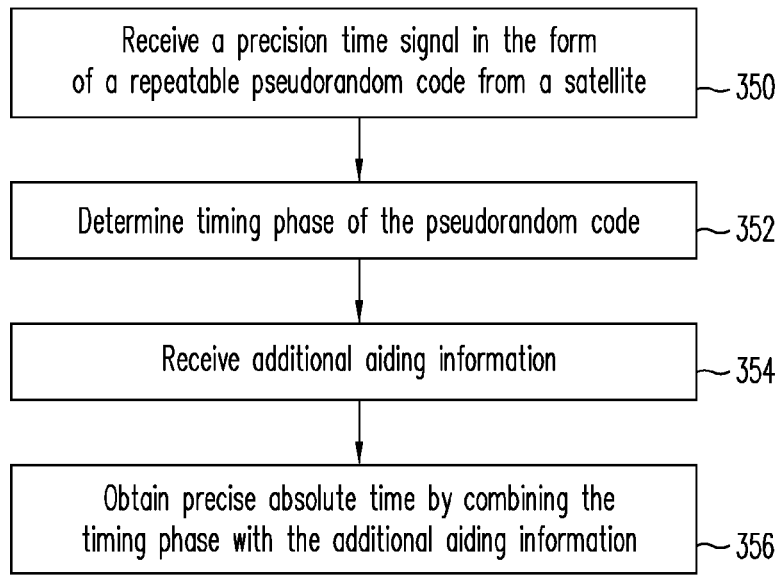
FIG. 2 provides a flow diagram illustrating a method of obtaining precise absolute time transfer from a satellite according to an embodiment of the present invention.

Referring now to FIG. 2, a flow diagram is provided that illustrates a method of obtaining precise absolute time transfer from a satellite according to an embodiment of the present invention. In an embodiment, FIG. 2 may be implemented for use with navigation system 300 of FIG. 1, but it may also be implemented for use with other systems or applications, such as network synchronization. Signal 305 received from satellite 304 (as shown in FIG. 1) permits localization when combined with signal 307, which comprises additional aiding information. The additional aiding information may be delivered to receiver unit 302 through network 308.

In block 350, receiver unit 302 receives signal 305, which comprises a precision time signal, from satellite 304. The precision time signal is received as a well-defined code that repeats periodically from satellite 304. It will be appreciated that a well-defined code may include any number of codes, for example, a pseudorandom code. In an example, an Iridium satellite may broadcast a pseudorandom code that repeats approximately every 23 seconds. Other implementations may include an alternating code structure. For example, in one such implementation, a coarse timing code may be followed by a pseudorandom code. In this implementation, the coarse timing code may comprise a repeating segment of pure carrier frequency which may be easily detected by receiver unit 302 for use with various operations, such as determining Doppler shift. The pseudorandom code in this implementation may be used to determine absolute time to high accuracy, but may be more difficult for receiver unit 302 to detect than the coarse timing code. In this regard, the coarse timing code may be used by receiver unit 302 to efficiently determine the approximate times at which the pseudorandom code is expected to be received.

In various embodiments, signal 305 received from satellite 304 is not required to include detailed navigation information and only one broadcast of signal 305 from a single one of satellites 304 may be used to initiate the aiding technique. Furthermore, the timing accuracy of signal 305 may be sufficiently degraded from typical GPS satellite performance, but accuracy on the order of 10 microseconds is sufficient. In one example, receiver unit 302 may operate in an attenuated or occluded environment (e.g., indoors) where the receiver unit 302 is able to receive signal 305 from satellite 304, but unable to receive signal 309 from satellite 306 due to the lower power of signal 309 and the attenuation of the environment. For Iridium satellites, for example, the structure of the repeatable pseudorandom code allows the receiver unit 302 to lock onto the pseudorandom code even in heavily attenuated environments up to about 45 dB attenuation at the antenna, that is, about 15 dB beyond where most GPS receivers fail to receive. Receiver unit 302 may also operate, for example, in environments where signal 309 is potentially jammed by a competing signal in a commercial scenario, or where signal 309 is intentionally jammed by an enemy in, for example, a military scenario.

In block 352, the relative timing phase of the code (also referred to as "n" or "code phase" below) of signal 305 from satellite 304 is determined by receiver unit 302 using low data rate correlation. For example, receiver unit 302 may be used to lock onto the code of the high power non-GPS precision time signal provided by signal 305 and determine the timing phase to within less than about 3 microseconds.

In block 354, receiver unit 302 receives signal 307, which includes additional aiding information through network 308. Alternatively, the additional aiding information may be received from satellite 304 in the case where, for example, receiver unit 302 is moving in and out of attenuated environments. In general, the update rate of the additional aiding information is rather low and could in principle be stored for 24 hours or longer. In one embodiment, the additional aiding information may comprise: the starting time of the code broadcasts, the expected frequency of the timing transmissions, a model of the non-GPS satellite orbits, and time bias correction information that may improve the fidelity of the precision time signal received from satellite 304 as described in block 350. Additionally, approximate time (e.g., within several seconds of accuracy) may be provided through network 308 or by a local clock of receiver unit 302.

In block 356, the timing phase of the code is converted to precise absolute time by combining the timing phase of the code with the additional aiding information that may be received through network 308 according to, for example equation 406 that will be described below with respect to FIG. 3.

Figure 3B:
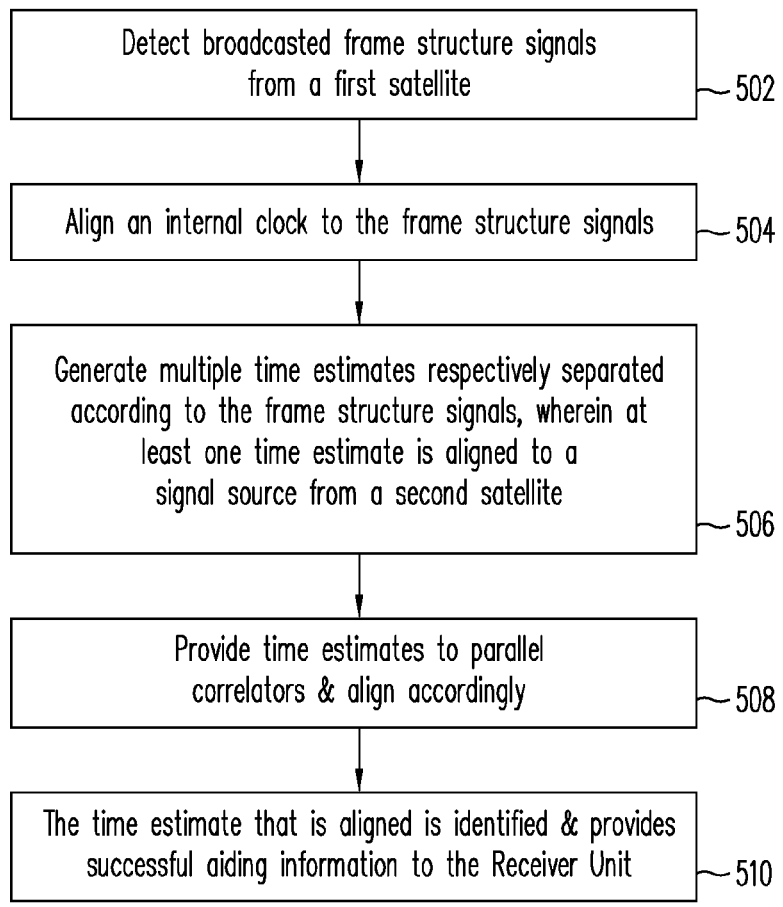
FIG. 3B provides a flow diagram illustrating a method of performing time transfer and navigation in attenuated or jammed environments according to an embodiment of the present invention.
Figure 3:
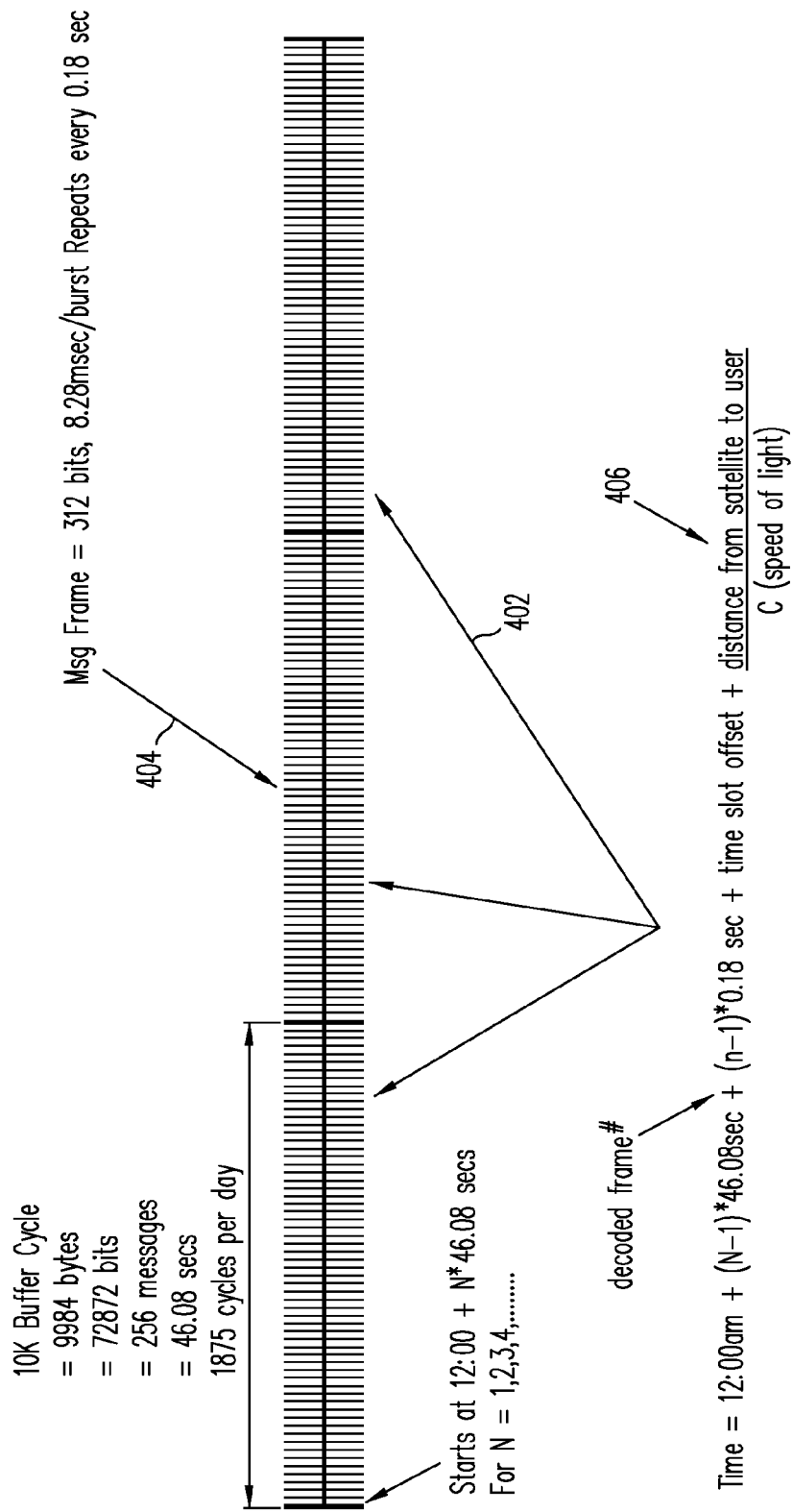
FIG. 3 illustrates a time transfer structure signal of a low earth orbit (LEO) satellite according to an embodiment of the present invention.

Referring now to FIG. 3, a time transfer structure signal of a low earth orbit (LEO) satellite is illustrated according to an embodiment of the present invention. The time transfer structure of FIG. 3 may be implemented for use in navigation system 300 of FIG. 1 according to an embodiment, but it may also be used in other systems or applications such as network synchronization. In this embodiment, satellite 304 is implemented with an Iridium satellite. It will be appreciated that although the time transfer signal for an Iridium satellite is illustrated, the description herein may be modified as appropriate for other satellite systems. In the example of FIG. 3, signal 305 may comprise 10K buffer cycles 402 that are repeatedly broadcasted by each satellite 304. Each 10K buffer cycle may be equal to 9984 bytes, or 72872 bits, or 256 messages, or 46.08 seconds. There are 1875 buffer cycles per day. A message frame 404 (also referred to as a message) is also illustrated, which may be equal to 312 bits or 8.28 milliseconds per burst. Other bits may be predefined by satellite 304. The 312 bits of message frame 404 are generally payload bits where communications, for example, telephone calls, occur with a voice update every 90 milliseconds. Each frame repeats every 0.18 seconds and all bits may be used to detect the edge of message frame 404. A burst may be offset by a specified "time slot" within the message frame 404.

If, for example, a pseudorandom code is 312 bits, there is a full buffer with 256 messages. In this example, each message has its own pseudorandom code such that it is not confused with other codes. The pseudorandom code may repeat approximately every 20-40 seconds. A known, simple pseudorandom code (or other code) may be employed to distinguish between the 256 messages and provide significant processing gain. In one embodiment, alternating between a coarse simple code (e.g., that promotes the detection of the carrier frequency) and a more precise pseudorandom code (e.g., that permits more accurate time alignment) may be performed.

In one example, receiver unit 302 may be used to determine what time it is. A buffer is loaded and broadcasting starts. The receiver unit 302 tunes into the right frequency and finds bits in the L band frame. The receiver unit 302 finds a code that matches an nth message of the buffer. However, this does not tell what time it is, only that it is the nth message (or the "code phase" of the repeating code).

The timing phase information and the additional aiding information as described in blocks 352 and 354 of FIG. 2 may be combined as set forth in block 356 of FIG. 2 to form an equation to obtain precise absolute time as in the following example with respect to the embodiment of FIG. 3, where equation 406 is used to determine time. In equation 406, it is assumed that 256 unique messages repeat every 46.08 seconds:

Time=12:00 am start time+($N$−1)*46.08 sec+($n$−1)
*0.18 sec+Time Bias+Range/$C$(speed of light)

Here, a known start time of the satellite 304 buffer playback, which may be delivered via data link, may be 12:00 am at a defined date, as illustrated in equation 406 of FIG. 3. "N" (also referred to as "current buffer cycle") is the number of times the pseudorandom code block of 256 messages has repeated since the start time. In one embodiment, "N" may be determined by a local clock of receiver unit 302 with accuracy of about less than 10 seconds. If the message broadcasts at 12:00 am, for example, and receiver unit 302 has a clock synchronized to network 308, receiver unit 302 may determine the current buffer cycle "N". That is, the receiver unit 302 helps resolve the number "N" based on certain known variables.

"n" is the code phase within the repeating sequence. In the example of equation 406, a time message plays every 0.18 seconds and comprises 256 unique pseudorandom messages. Afterwards, the pseudorandom code repeats from the beginning. Therefore "n" is a number between 1 and 256. "n" is measured from satellite 304 using, for example, the pseudorandom code, and it is accurate to less than 10 microseconds.

If receiver unit 302 knows which message is received, then the code phase "n" may be determined. Receiver unit 302 may perform a correlation to determine which message was received even in the presence of noise. For example, if noise is present, random bits may be received, then the message, then random bits again. Thus, the message may be corrupted by noise and may include corrupted bit values. Assuming that a long message is sent, for example, a 1000 bit message, the bits may be compared to the bits received. If, for example 980 bits are correct, then the next 1000 bits are compared and so on until a peak is reached. A peak is reached when the number of correct bits is greater than the average number. In the example of sending a message of 1000 bits, if the peak is, for example, 600, then it is determined that that is the correct message. Thus, the message is received and statistically determined in the presence of noise at a particular time. A method for determining the code phase "n" of a received satellite signal will be described in FIG. 3A below according to an embodiment.

"Time Bias" may represent any timing bias in system 300, for example, and may compensate for measured errors in the clock of satellite 304 and/or known time slot changes in the transmission sequence. Time slots may be provided by satellite 304, or they may be measured by a reference station, or they may be fixed or predictable as part of the service. In the example of FIG. 3, Iridium's message frame of 90 milliseconds may be broken up into time slots. As shown in FIG. 3, bursts may occur and may be offset by a specified time slot within the message frame. Receiver unit 302 may know which time slot to use through network 308. Network 308 provides basic information such as the frequency of transmission, that is, the sub band of the transmission, which changes frequently depending on, for example, the frequency of broadcasting and/or other factors.

"Range" represents the distance between satellite 304 and receiver unit 302, and is computed using an orbit model for satellite 304 that may be delivered via data link, suitably accurate knowledge of the position of receiver unit 302, and approximate time (as an input to a satellite orbit model). In one embodiment, to obtain an accuracy within about 10 microseconds, the range estimate must be accurate to about 3000 m, which may equate to about 20,000 m of horizontal accuracy on the ground. This level of positioning may be easily achieved, for example, via cell network techniques. Additionally, simple beam coverage methods may be employed to determine the position of receiver unit 302 based on the knowledge of which non-GPS satellite beam the user is presently located in and the recent beam time history. Numerous other methods of coarse positioning may also be suitably employed. In one embodiment, satellite orbit information (ephemeris) for satellite 304 includes information such as the location of satellite 304 within a constellation of satellites at various points in time and other information that can be used by receiver unit 302 to accurately obtain clock values from satellite 304. In this embodiment, network 308 may easily determine the location of receiver unit 302 (or the user) within less than one kilometer. The range may be accurate to about 3 kilometers. The approximate time of receiver unit 302 may be used with the orbit information to determine the location of satellite 304. After the range of satellite 304 is determined, it is then divided by the speed of light (also referred to as "C").

Figure 3A:
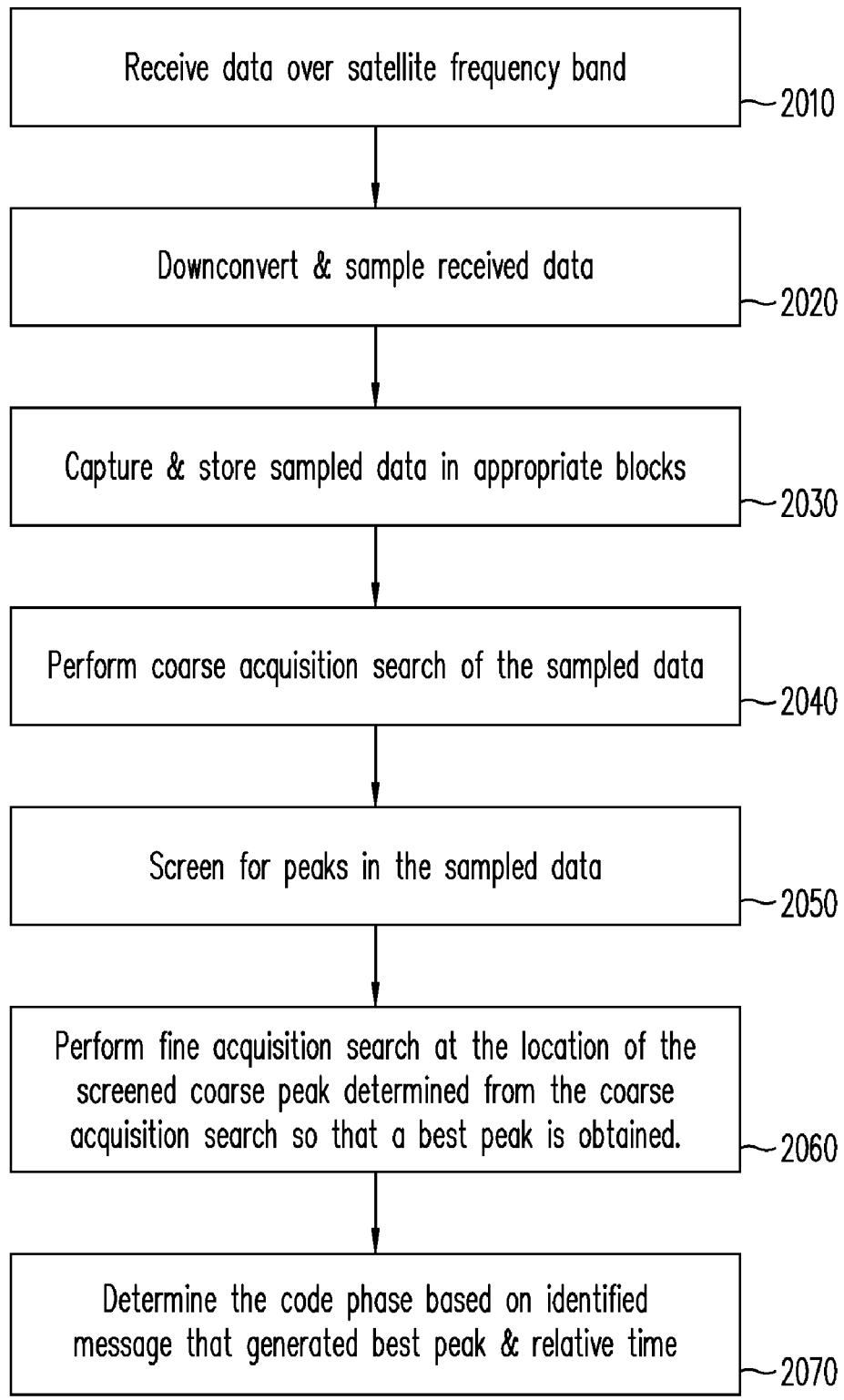
FIG. 3A shows a flow diagram of a method for determining the code phase of a received satellite signal according to an embodiment.

FIG. 3A shows a flow diagram of a method for determining the code phase of a received satellite signal according to an embodiment. FIG. 3A is an example wherein satellite 304 comprises an Iridium satellite. In block 2010, a signal comprising data may be received from an Iridium satellite and collected over the entire Iridium frequency band with a receiver unit having an appropriate antenna, an amplifier and a downconverter (as shown in FIG. 1A). In block 2020, the received data may be downconverted, for example, by 1606 MHz, and the data may be sampled, for example, at 50 Msamples per second.

In block 2030, the sampled data may be captured and stored in memory in appropriate blocks, for example, in blocks of one second segments.

In block 2040, a coarse acquisition search of the sampled data is performed. In this example, approximately 9 ms of data may be selected for detailed processing. Doppler of the captured data may be estimated using a known orbit model and an estimated time. The data may be digitally demodulated with sine and cosine functions based on a known (or estimated) frequency sub-band and access. Demodulation also includes the estimated Doppler frequency. The data may then be decimated by a factor of, for example, approximately 111. A Fast Fourier Transform (FFT) may be used on the decimated data to determine the highest peak and associated frequency. It should be noted that the associated frequency may be used to further improve demodulation in the next iteration. Demodulation in general would yield a DC result, however, imperfect Doppler estimates generally generate a low frequency component. Next, the following 1 millisecond block of sampled data may be considered and the process may be repeated.

In block 2050, the processed data is screened for peaks performing consistency checks. For example, peaks should be separated by "n"*90 milliseconds.

In block 2060, once peaks are screened, fine acquisition may be performed at the location of the coarse peak+180 milliseconds−0.5*window. The window represents the range in time where the code is expected to be found. For example, the received data may be correlated against the 128 non-zero messages in the code; the highest correlation peak may then be recorded; and the time step may be incremented by a certain number of microseconds. This process may then be repeated for the duration of the window.

In block 2070, the code phase may be determined by the receiver unit when the data was captured by knowing which message generated the best peak and knowing the relative time.

Once the code phase is determined, precise absolute time may be determined as described above with respect to equation 406 of FIG. 3.

After precise absolute time is computed according to the techniques described above according to one or more embodiments, the precise absolute time may be used in numerous applications such as network synchronization or as an aid to a positioning system such as GPS.

In the positioning aiding embodiment, the precise absolute time determined as described above may be employed to "focus" or align correlators of receiver unit 302, for example a GPS receiver. In this case, a GPS receiver may have numerous parallel positioning system correlators which, when sufficiently time-aligned (e.g., using the techniques described herein), may be able to lock on to signal 309, for example a GPS signal, from satellite 306, for example a GPS satellite, even in a jammed or attenuated environment.

Receiver unit 302 may also compensate for Doppler shift, which refers to a change in frequency of emitted waves produced by motion of an emitting source relative to an observer. As a satellite moves through the sky, the transmission frequency of the satellite signals changes. By using its knowledge of time, receiver unit 302 may predict and compensate for Doppler shift such that the correct frequency may be acquired. In one embodiment, Doppler shift may be calculated by the following equation:

$$\text{Doppler} = \text{range rate} \div C \times \text{normal frequency of transmission}$$

As discussed above, the range to satellite 304 is the distance between the locations of receiver unit 302 and satellite 304. The range rate is a function of range and time not unlike for example, the measurement of velocity based on the distance travelled between two different points in time. Finally, in the Doppler equation above, the nominal frequency of transmission for an Iridium satellite, for example, may be on the order of 1.6 GHz. "C" refers to the speed of light.

Network 308 provides satellite information as well as pre-tuning information for signals such that as Doppler shift occurs, the signals change to stay in tune accordingly.

The Doppler profile of satellite 304 may also aid in determining timing information. Receiver unit 302 may monitor various signals 305 received from satellite 304 over time. By determining the Doppler shift that occurs as satellite 304 moves overhead, receiver unit 302 may obtain a precise determination of the position of receiver unit 302 and timing information. Thus, with reference again to equation 406 in FIG. 3, the estimate of the location of receiver unit 302 may be performed by referring to the Doppler profile of satellite 304.

Thus, in the embodiments described above, precise absolute time according to equation 406 may be conveyed to receiver unit 302 where there is a ground network (e.g., network 308) to support a space network (e.g., one or more of satellites 304 and/or 306).

In another embodiment, which will be described in more detail with respect to FIG. 3B below, precise absolute time may be achieved in the absence of additional aiding information provided as described above by using, for example, the native L band burst structure signal of an Iridium satellite. In various embodiments, satellite 304 may be a LEO satellite such as Iridium and satellite 306 may be a GPS satellite. In such embodiments, it is known that an Iridium satellite uses frequencies according to an L band structure from 1610 MHz to 1625 MHz. GPS carriers are also in the L band, centered at 1176.45 MHz (L5), 1227.60 MHz (L2), 1381.05 MHz (L3), and 1575.42 MHz (L1) frequencies. Because of the proximity between the Iridium and GPS frequencies, receiver unit 302 is capable of receiving signals together from both satellite systems, Iridium and GPS satellite systems, without the need for an extra antenna.

Each Iridium satellite maintains an internal clock that is monitored and maintained to an accuracy of within 10 microseconds with respect to Coordinated Universal Time (UTC, Fr. Temps Universel Coordonne, also known as Greenwich Mean Time or Zulu time) without clock drift. Thus, L band signals provided by Iridium satellites may be accurately tied to UTC time within approximately 10 microseconds. The L band Iridium satellite signals are structured with 90 millisecond frames. Thus, by determining the edges of L band frames of Iridium satellite signals, accurate timing information may be obtained.

Referring now to FIG. 3B, a flow diagram illustrating a method of performing time transfer and navigation in attenuated or jammed environments according to an embodiment of the present invention is provided. The method illustrated in FIG. 3B may be implemented with the navigation system of FIG. 1, except that in this embodiment, additional aiding information provided via network 308 is unavailable.

In block 502, the broadcasted frame structure of signal 305 (e.g., when implemented by L band Iridium satellite signals)

from satellite 304 is detected by receiver unit 302. Even without a well-defined or refined code, it is possible for receiver unit 302 to detect the L Band frame of the Iridium transmission signals. Because in this embodiment it is assumed that additional aiding information is unavailable from network 308, receiver unit 302 prepares successive guesses or estimates of absolute time. With sufficient prior knowledge the number of time estimates may often be bound to a reasonable number. For example, within 100 frames of the Iridium frame structure there is a GPS second that lines up. Thus, the number of time estimates or guesses may be reduced to 100 times.

In block 504, once successive estimates are produced, a local clock of receiver unit 302 is aligned to the frame structure of signal 305 of satellite 304.

In block 506, multiple time estimates that are respectively separated according to the frame structure signals are generated wherein at least one time estimate is aligned to signal 309 of satellite 306.

In block 508, the time estimates may be provided to parallel correlators of receiver unit 302. The parallel correlators are then aligned according to the time estimates.

In block 510, the time estimate that is aligned to signal 309 of satellite 306 is identified and provides aiding information to receiver unit 302. This aiding information significantly improves the ability of receiver unit 302 to efficiently detect signal 309 of satellite 306. That is, as discussed above according to an embodiment where an Iridium satellite is used to implement satellite 304, it is possible to leverage numerous parallel phone calls, for example, to determine the frame edge of the satellite signal frame structure. In this example, Iridium has a frame structure of 90 milliseconds. Within every 100 frames, there is a corresponding GPS second that lines up therewith. Therefore, by simply knowing the frame edge, GPS processing is significantly improved as it is easier to obtain aiding information by trying 100 frames than by trying an infinite number of estimates.

The systems and methods described above with respect to FIGS. 1-3B for obtaining a precise absolute time according to one or more embodiments may be used to facilitate indoor navigation by instantaneously initializing a survey of a wireless network station (e.g., a WiFi transceiver, a WiFi-compatible device, 802.11-compatible device, or other wireless device). According to one or more embodiments, by using the precise absolute time described above, wireless network stations (e.g., Internet hotspots and/or other types of wireless network stations) may act as positioning beacons (with a surveyed location) for receiver unit 302. As a result, a roaming user of receiver unit 302 may navigate in indoor environments.

Figure 4:
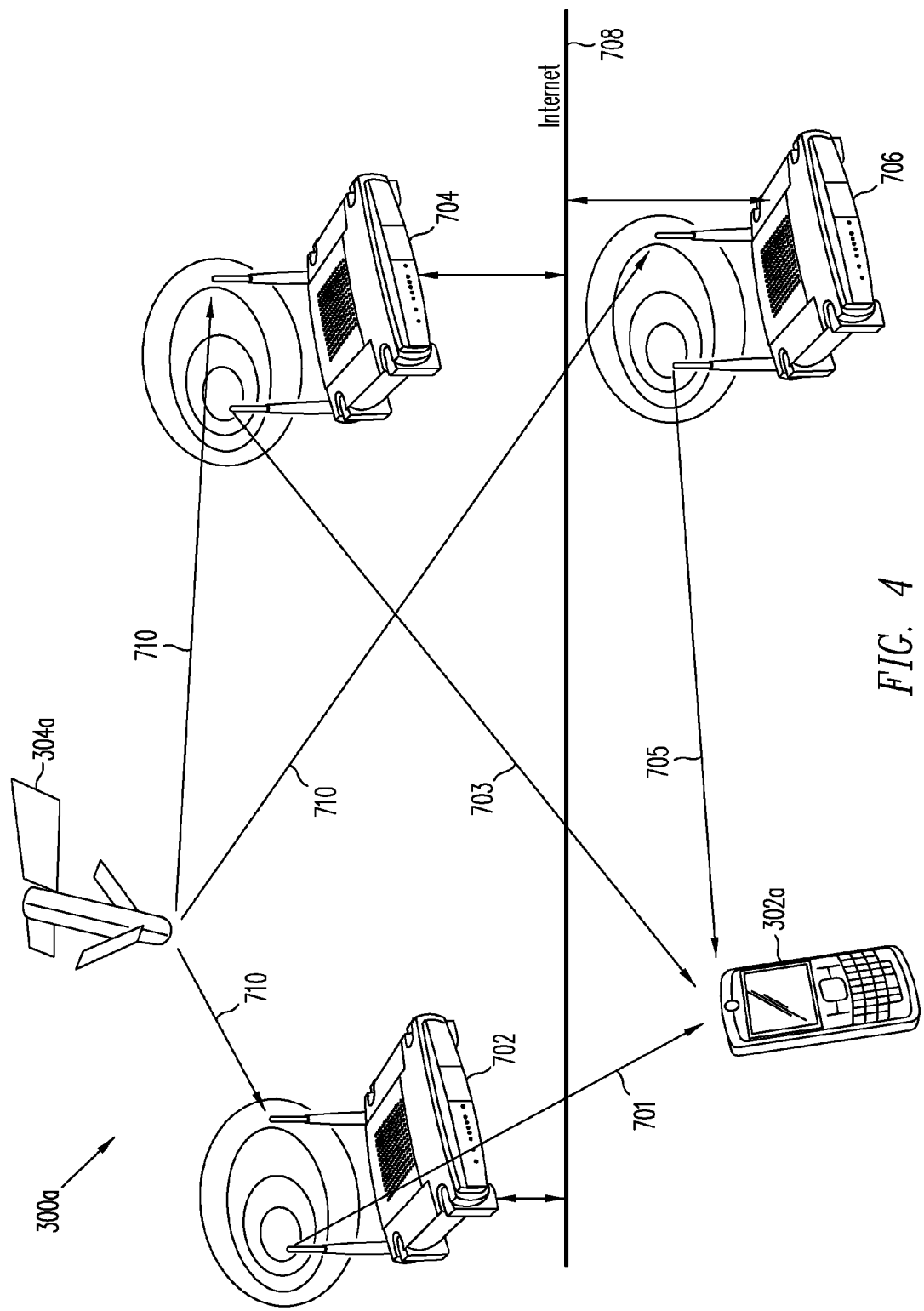
FIG. 4 provides a self forming navigation system that uses satellites to provide wireless network station localization according to an embodiment of the present invention.

FIG. 4 provides a self forming navigation system 300a that uses satellites to permit wireless network station localization according to an embodiment of the present invention. In FIG. 4, a receiver unit 302a may be configured to receive ranging signals 701, 703, and 705, which may comprise aiding information from wireless network stations 702, 704, and 706. Each wireless network station 702, 704, and 706 is in signal communication with network 708 and also receives precision time and ranging signals 710 from satellite 304a. In one embodiment, the position of a receiver unit 302a may correspond to the position of a roaming user.

It will be appreciated that wireless network stations 702, 704 and 706 may include WiFi transceivers as well as other wireless network station devices, configurations, and/or networks. In addition, network 708 may include the Internet or other appropriate networks such as cellular networks or TV networks.

Figure 5:
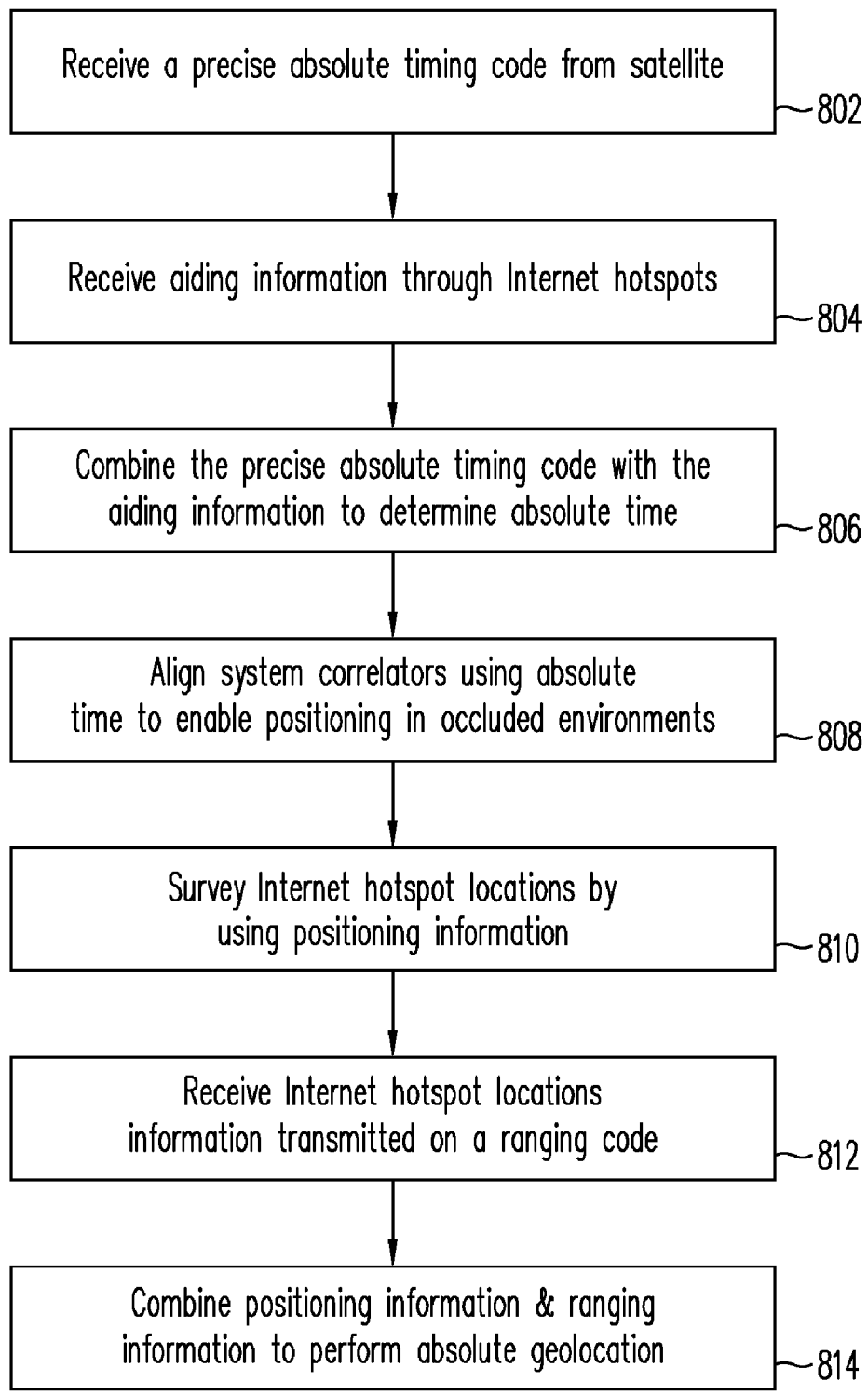
FIG. 5 provides a flow diagram illustrating a method for performing geolocation by integrating satellite signals and wireless network signals according to an embodiment of the present invention.

Referring to FIG. 5, a flow diagram illustrating a method for performing geolocation by integrating satellite signals and wireless network station signals is provided according to an embodiment of the present invention. The flow diagram of FIG. 5 may be implemented for use in the navigation system of FIG. 4. In this embodiment, satellite signals from, for example, Iridium satellites and GPS satellites may be integrated with WiFi or 802.11 type signals.

In block 802, receiver unit 302a receives precise absolute timing code signals 710 in the form of a repeatable code such as a pseudorandom code broadcasted from satellite 304a, for example a LEO satellite (as described above according to one or more embodiments with respect to FIGS. 1-3B).

In block 804, receiver unit 302a receives aiding information via wireless network station 702, 704, and/or 706.

In block 806, the precise absolute timing code signals 710 are used with the aiding information from wireless network station 702, 704, and/or 706 to determine precise absolute time to within several microseconds accuracy.

In block 808, system correlators of receiver unit 302a, for example, GPS correlators, are aligned using the precise absolute time to facilitate positioning, for example GPS positioning, in occluded environments.

In block 810, receiver unit 302a surveys the locations of wireless network stations 702, 704, and 706 using the positioning information determined by using the precise absolute time.

In block 812, receiver unit 302a receives location information of wireless network stations 702, 704, and 706, which is transmitted on a ranging code.

In block 814, receiver unit 302a performs absolute geolocation by combining positioning information and ranging information from one or more of wireless network stations 702, 704, and 706.

In one embodiment, a roaming user's position (e.g., a position of receiver unit 302a), if desired, may be reported through wireless network stations 702, 704, and 706 and therefore facilitate user tracking.

Figure 6:
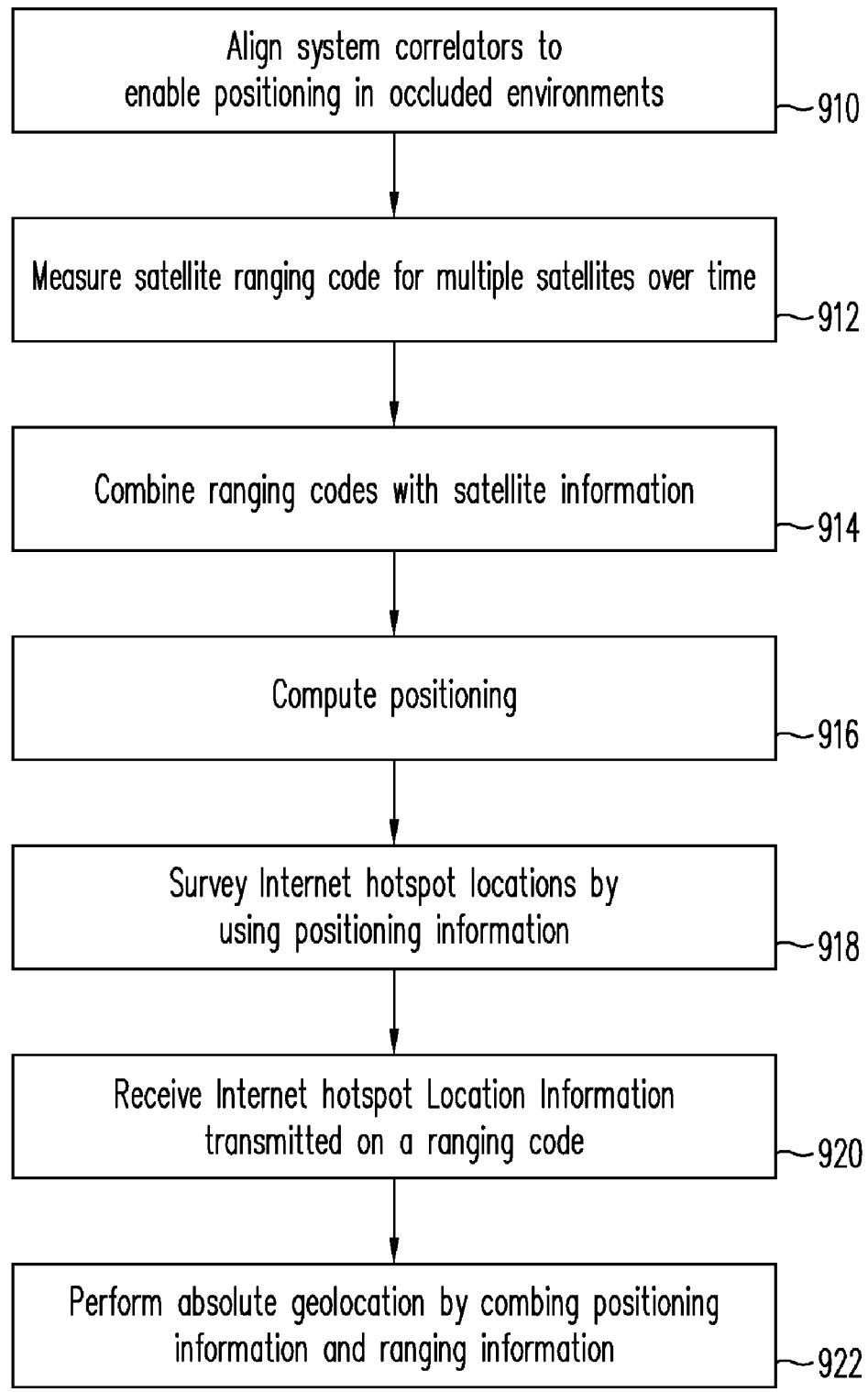
FIG. 6 provides a flow diagram illustrating a method for performing geolocation by integrating satellite signals and wireless network signals according to another embodiment of the present invention.

FIG. 6 provides a flow diagram illustrating a method for performing geolocation by integrating satellite signals and wireless network signals according to another embodiment of the present invention. The flow diagram of FIG. 6 may be implemented for use in the navigation system of FIG. 4. In this embodiment, positioning of the wireless network stations acting as beacons may also be achieved by integrating, for example, Iridium satellite signals (only) and WiFi or 802.11 type signals (with longer integration times).

It will be appreciated that the method described above with respect to FIG. 5 in blocks 802-806 may be used in this embodiment to determine precise absolute time to within several microseconds accuracy. Once absolute time is determined, in block 910 of FIG. 6, system correlators of receiver unit 302a are aligned by using the absolute time to facilitate positioning in occluded environments.

In block 912, receiver unit 302 measures a satellite ranging code (e.g., an Iridium iGPS ranging code) for multiple satellites over time.

In block 914, assuming wireless network stations 702, 704, and 706 are stationary, the ranging code is combined with satellite information such as orbit information and timing signals.

In block 916, receiver unit 302a computes positioning using multilateration by integrating multiple satellite (e.g. Iridium) passes iteratively.

In block 918, the locations of WiFi transceivers 702, 704, and 706 are surveyed by using the positioning information.

In block 920, receiver unit 302a receives the information on the locations of WiFi transceivers 702, 704, and 706, which is transmitted on a ranging code.

In block 922, receiver unit 302a performs absolute geolocation by combining positioning information and ranging information from one or more WiFi transceivers 702, 704, and 706.

According to an embodiment, a roaming user's position (if desired) may be reported through the wireless network and therefore facilitate user tracking.

To determine ranging, for example, the differential time of arrival may be determined. The WiFi transceivers may send a message to receiver unit 302a, for example, a telephone or a computer, and as soon as it is received a message is sent back to the WiFi transceivers. The processing period of the computer or telephone is known. The WiFi transceivers know how long receiver unit 302a took to respond back to the WiFi transceivers. Thus, the differential time of arrival (DTOA) may be computed and would be equal to the processing period of the receiver unit plus the time it took for the message to get back to the WiFi transceivers.

Where applicable, various embodiments provided by the present disclosure can be implemented using hardware, software, or combinations of hardware and software. Also where applicable, the various hardware components and/or software components set forth herein can be combined into composite components comprising software, hardware, and/or both without departing from the spirit of the present disclosure. Where applicable, the various hardware components and/or software components set forth herein can be separated into sub-components comprising software, hardware, or both without departing from the spirit of the present disclosure. In addition, where applicable, it is contemplated that software components can be implemented as hardware components, and vice-versa.

Software in accordance with the present disclosure, such as program code and/or data, may be stored on one or more computer readable mediums. It is also contemplated that software identified herein can be implemented using one or more general purpose or specific purpose computers and/or computer systems, networked and/or otherwise. Where applicable, the ordering of various steps described herein can be changed, combined into composite steps, and/or separated into sub-steps to provide features described herein.

Embodiments described above illustrate but do not limit the invention. It should also be understood that numerous modifications and variations are possible in accordance with the principles of the present invention. Accordingly, the scope of the invention is defined only by the following claims.

We claim:

1. A method of performing navigation in attenuated or jammed environments, the method comprising:
   detecting a frame structure of a first signal received from a first satellite;
   aligning a clock of a receiver unit to the detected frame structure;
   generating a set of time estimates respectively separated according to the frame structure, wherein at least one of a predetermined number of the time estimates is aligned to a second signal of a second satellite, wherein the set of generated time estimates is bounded by the predetermined number;
   providing the time estimates to system correlators of the receiver unit;
   aligning the system correlators according to the time estimates;
   identifying the at least one of the time estimates that is aligned to the second signal of the second satellite, wherein the at least one of the time estimates provides aiding information to the receiver unit; and
   using the at least one time estimate to detect the second signal of the second satellite.

2. The method of claim 1, wherein the second signal of the second satellite is a positioning signal.

3. The method of claim 1, wherein the frame structure comprises a plurality of frames repeated in a sequence.

4. The method of claim 3, wherein the frame structure is an L band frame structure.

5. The method of claim 3, wherein each frame comprises a pseudorandom code unique within the sequence.

6. The method of claim 5, wherein the predetermined number is approximately 100.

7. The method of claim 1, wherein the first satellite is a Low Earth Orbit (LEO) satellite.

8. The method of claim 7, wherein the LEO satellite is an Iridium satellite.

9. The method of claim 1, wherein the second satellite is a global positioning system (GPS) satellite.

10. The method of claim 1, wherein the receiver unit is an iGPS receiver.

11. A receiver unit adapted for use in attenuated or jammed environments comprising:
    an antenna adapted to receive a first signal from a first satellite and to receive a second signal from a second satellite;
    a processor; and
    a memory adapted to store a plurality of computer readable instructions which when executed by the processor are adapted to cause the receiver unit to:
    detect a frame structure of the first signal of the first satellite;
    align a clock of the receiver unit to the detected frame structure;
    generate a set of time estimates respectively separated according the frame structure, wherein at least one of a predetermined number of the time estimates is aligned to the second signal of the second satellite, wherein the set of generated time estimates is bounded by the predetermined number;
    align system correlators according to the time estimates;
    identify the at least one of the time estimates that is aligned to the second signal of the second satellite, wherein the at least one of the time estimates provides aiding information to the receiver unit; and
    use the at least one time estimate to detect the second signal of the second satellite.

12. The receiver unit of claim 11, wherein the second signal of the second satellite is a positioning signal.

13. The receiver unit of claim 11, wherein the frame structure comprises a plurality of frames repeated in a sequence.

14. The receiver unit of claim 13, wherein the frame structure is an L band frame structure.

15. The receiver unit of claim 13, wherein each frame comprises a pseudorandom code unique within the sequence.

16. The receiver unit of claim 15, wherein the predetermined number is approximately 100.

17. The receiver unit of claim 11, wherein the first satellite is a Low Earth Orbit (LEO) satellite.

18. The receiver unit of claim 17, wherein the LEO satellite is an Iridium satellite.

19. The receiver unit of claim 11, wherein the second satellite is a global positioning system (GPS) satellite.

20. The receiver unit of claim 11, wherein the receiver unit is an iGPS receiver.

* * * * *